UNITED STATES PATENT OFFICE.

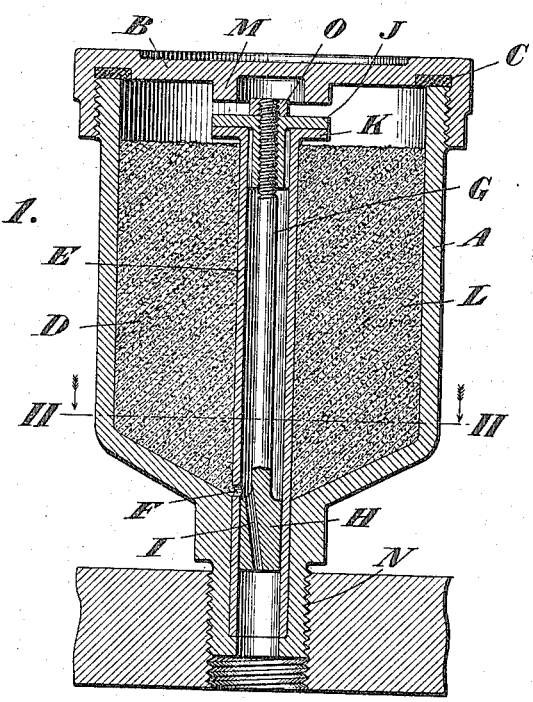
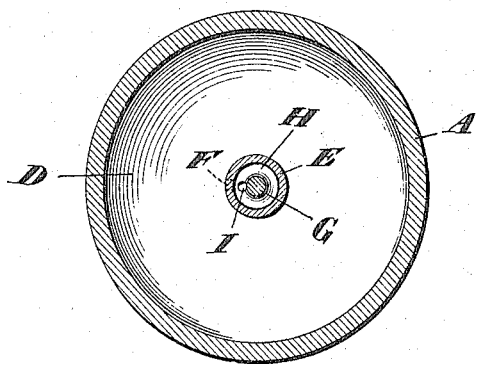

HARRY R. GEER, OF JOHNSTOWN, PENNSYLVANIA.

LUBRICATOR.

1,169,797.

Specification of Letters Patent.

Patented Feb. 1, 1916.

Application filed November 19, 1915. Serial No. 62,280.

*To all whom it may concern:*

Be it known that I, HARRY R. GEER, a citizen of the United States, residing in the city of Johnstown, in the county of Cambria and State of Pennsylvania, (whose post-office address is Johnstown, Pennsylvania,) have invented certain new and useful Improvements in Lubricators; and I do hereby declare the following to be a full, clear, and exact description of the invention, such as will enable others skilled in the art to which it appertains to make and use the same.

My invention relates to a lubricator which is automatic in its action and is especially adapted to lubricate the walls, pistons, rings, valves, etc., of fluid pressure apparatus, and to this end the feed of the lubricating material is controlled by the regularly varying pressures which exist in fluid pressure apparatus when operating.

Referring now to the annexed sheet of drawings which forms part of this specification and in which like characters refer to like parts:—Figure 1 is a longitudinal sectional elevation of my lubricator, showing it attached to a portion of a fluid pressure apparatus, a steam-chest, or other fluid pressure chest, illustrating the manner of securing the same by the threaded projection fitted in a corresponding internally threaded hole; and Fig. 2 is a cross sectional plan taken on the line II—II of Fig. 1.

Referring now to the characters of reference on the drawings: A is the body or shell portion of my lubricator, B is the internally threaded screw cap for same, which may be provided with a gasket C to make a tight fit of these parts, D is the container portion of my lubricator adapted to receive lubricating material, such as graphite, floated mica, talc, or preferably pulverulent material, indicated as L, although I may use other lubricants of a character adapted to flow through the openings F and I.

E is a feed pipe or tube, which near its lower portion within the lubricant container, is provided with a small opening F, forming a communication between the lubricant container and the inner portion of the tube, and within the tube is mounted a reciprocable valve, the stem portion of which is indicated as G, the lower piston-like portion being indicated as H and provided with a hole I therethrough, thereby forming a communication from the opening F into the lower part of the feed tube E, which lower part of the feed tube communicates with the interior of the fluid pressure apparatus to be lubricated. The upper portion of the valve is provided with an outwardly projecting flange J, which is adapted to be seated upon the corresponding flange K of the tube E and thereby close the upper opening from the lubricant container to the interior of the tube E at its upper end. The upper portion of the valve is screw-threaded, as shown, and the flange J is adjustably secured thereon by being screw-threaded thereto and also secured by the clamp nut O.

M is the downwardly projecting portion of the cover, adapted to contact with and form a stop for the upward movement of the valve, the flange J of which contacts with the projection M at the upper limit of its stroke.

The lower portion N of my lubricator is screw-threaded and adapted to be screwed into a corresponding hole in the apparatus to be lubricated.

Having thus given a description of my apparatus, I will now describe its operation:—The lubricator being in position on the fluid pressure apparatus to be lubricated, the excess of pressure, such as compression or initial pressure within the apparatus forces the valve G upward, thereby closing the hole F by the opposition of the solid wall of the piston plug H until the upper flange J contacts with the projection M, thereby leaving an open space between the flange K of the feed pipe and the upper portion J of the valve. This allows the initial or high pressure from the apparatus to pass through the lower portion of the tube E, thence through the opening or port I in the lower piston valve H into the upper part of the tube E, thence out of the upper portion of the tube E between the flanges J and K, thereby causing a high pressure within the lubricant container D. As the apparatus recedes in its cycle of movement, the pressure therein is reduced, whereupon the valve G and its attachments move downwardly by gravity or by the reduction of this fluid pressure. The contained pressure, however, within the lubricant container being higher than that now within the apparatus, the opening I then communicates with the opening F in the bottom of the feed pipe and, on account of the higher pressure within the lubricator, a small portion of the lubricant is forced from the lubricant container through the openings F and I into the apparatus. After this is done, the pressure in the apparatus increases, again raising the valve G and its attachments and the operation just described is repeated. By this means a small and adjustable portion of lubricant is admitted into the apparatus at each stroke or charge of pressure, thereby forcing a small, but regular and sufficient supply of lubricant to the interior portions of the fluid pressure apparatus.

It will be noted that the normal position of the valve G and its piston plug H is such that the opening I is adapted to communicate with the opening F and thence to the interior of the lubricant container. Thus the normal or static position of the parts is such that a communication exists from the container to the fluid pressure apparatus. In other words, the normal position of the parts is such that an opening exists from the container to the apparatus to be lubricated. Any increase of pressure during the cycle of movement, however, closes this opening temporarily while allowing the pressure applied to add to that inside of the container, and after this is done the openings automatically are made to communicate with each other upon a slight lowering of the pressure, so that a small quantity of lubricant is fed into the apparatus due to the excess of pressure in the lubricant over that then existing in the apparatus.

A particular feature of this construction is that by reason of the fact that the openings F and I normally communicate with each other and with the interior of the apparatus, a very slight difference of pressure, such as exists in slow moving pumps, will suffice to operate my lubricator in the manner described, and this is not true of apparatus which is not normally open, as such apparatus requires greater differences of pressure for its successful operation.

While I have shown and described my invention in considerable detail, I do not wish to be limited to the exact construction specified, but may use such substitutions, modifications or alterations as fall within the scope of my invention or as set forth in the claims.

Having thus described my invention, what I claim and desire to secure by Letters Patent is:—

1. The combination with a fluid pressure apparatus in which the internal pressure varies recurrently, of a lubricator mounted thereon, a feed pipe extending within said lubricator and adapted to communicate with the fluid pressure apparatus aforesaid, said feed pipe also having an opening in its side wall, a reciprocable valve mounted in said feed pipe, having at the lower end a piston provided with an opening adapted to normally communicate with the opening in the side wall of the feed pipe, the upper portion of said valve being provided with an outwardly projecting portion adapted to seat upon and close the upper portion of said feed pipe.

2. The combination with a fluid pressure apparatus in which the pressure varies in cycles, of a lubricator mounted thereon, a feed pipe mounted within said lubricator and adapted to connect with the fluid pressure apparatus, said feed pipe also having an opening in its wall, a reciprocable valve adapted to open and close the upper end of said feed pipe and to also open and close the opening in the wall of said feed pipe, the opening in the wall of the feed pipe normally connecting with the fluid pressure apparatus, whereby, as the pressure increases, the opening in the wall of the feed pipe is closed and that at the upper portion of said pipe is opened, allowing the pressure to increase within the lubricator, and as the pressure in the fluid pressure apparatus decreases, the opening at the upper end of the feed pipe is automatically closed by said valve and the opening in the side wall of the feed pipe communicates with the lower opening in said valve and thence to the fluid pressure apparatus.

3. The combination with a fluid pressure apparatus in which the pressure varies in cycles, of a lubricator mounted thereon, said lubricator having an opening normally communicating with said apparatus, another opening in said lubricator adapted to communicate with the apparatus and to normally be closed, and means actuated by the varying pressure for closing the one opening while opening the other, and vice versa.

In witness whereof I hereunto affix my signature in the presence of two witnesses.

HARRY R. GEER.

Witnesses:
OLIVER B. HICKOX,
FRED. A. STAHL.

Copies of this patent may be obtained for five cents each, by addressing the "Commissioner of Patents, Washington, D. C."